June 29, 1965  H. C. ZEISLOFT  3,191,610
CENTRIFUGAL VALVE HAVING VARIABLE CURVED
ELASTIC SLITTED TUBES
Original Filed Jan. 14, 1960

INVENTOR.
Harry C. Zeisloft
BY
Paul Fitzpatrick
ATTORNEY

United States Patent Office 3,191,610
Patented June 29, 1965

3,191,610
CENTRIFUGAL VALVE HAVING VARIABLE CURVED ELASTIC SLITTED TUBES
Harry C. Zeisloft, Flint, Mich., assignor to General Motors Corporation, Detroit, Mich., a corporation of Delaware
Original application Jan. 14, 1960, Ser. No. 2,401. Divided and this application Apr. 16, 1963, Ser. No. 273,410
5 Claims. (Cl. 137—54)

This application is a division of my application Serial No. 2,401, filed January 14, 1960, for Throttling Valves (now abandoned). The disclosure of that application is duplicated in U.S. Patent No. 3,125,118, a division thereof, and is incorporated herein by reference thereto.

My invention is directed to throttling valves in which the flow area is varied by elastic deformation of a curved elastic tube. I provide slits generally normal to the axis of the curved tube, either in the outer or inner side of the tube, these slits being opened or closed by changes in the curvature of the tube. Such a throttling device is suited to many applications in the control of fluid flow. It is adapted to control of the throttling valve; that is, of the area of the slits, by various types of control means. For example, the curvature of the elastic tube may be varied by pressure within the tube or by pressure within a Bourdon tube connected to the elastic tube; it may be varied by the effect of centrifugal force on such an elastic tube mounted on a rotating member; and it may be varied by combinations of such control means or other means adapted to vary the curvature of the slitted elastic tube.

The nature of the invention and the advantages thereof will be apparent to those skilled in the art from the succeeding detailed description of the preferred embodiment of the invention and the accompanying drawings thereof. It will be understood that the drawings are of a somewhat schematic nature, since it is desirable in the interest of conciseness to eliminate inmmaterial details of structure which may be a matter of choice in accordance with usual design principles.

Figure 1:
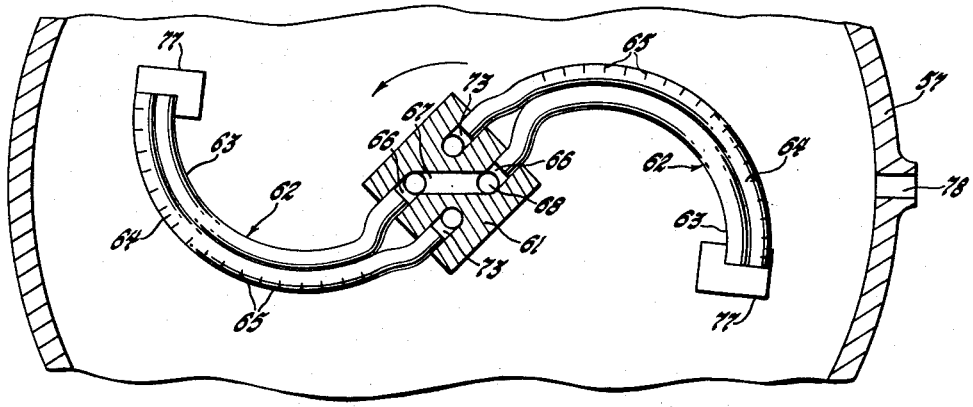
FIGURE 1 is a sectional view of a speed-responsive throttling valve.
Figure 2:
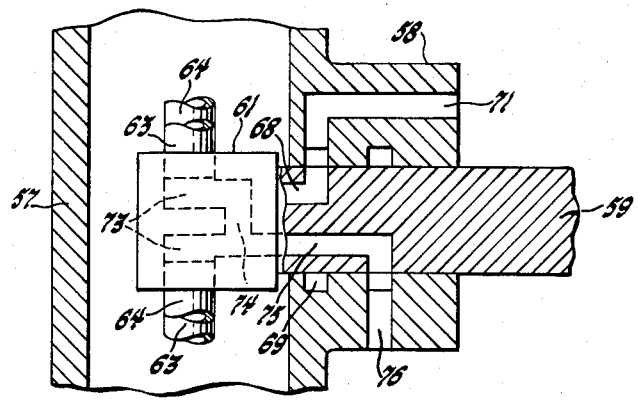
FIGURE 2 is a fragmentary view, with parts in section, further illustrating the valve shown in FIGURE 1.

The device includes a case or housing 57 which may be of cylindrical form and is only partially illustrated. A boss 58 on the case journals a shaft 59 which may be rotated by any device to be controlled. A head 61 which may be integral with the shaft mounts two throttling valve devices 62 which may be similar to the tube structure illustrated in FIGURE 6 of Patent 3,125,118 and explained fully in the patent. Each device 62 includes a Bourdon tube 63 and an elastic tube 64 provided with slits 65 in its outer surface. The tubes 62 are mounted in apertures 66 in the head 61 which are interconnected by a passage 67 in the head and communicate with passage 68. Passage 68 communicates through a recess 69 in the hub 58 with a control port 71 through which a control pressure may be supplied to both of the Bourdon tubes 63. The elastic tubes 64 are similarly mounted in openings 73 in the head which communicate through passages indicated generally by 74 in FIGURE 2 with a single passage 75 communicating with an inlet port 76 in the hub 58. The outer or free ends of tubes 63 and 64 are closed, preferably by a block or flyweight 77 of appreciable mass brazed to the ends of the tubes. An outlet port 78 is provided in the case 57.

When the shaft 59 is rotated, the effect of centrifugal force on the tubes 63 and 64 and weights 77 acts to straighten the tube assemblies 62 and thereby reduce the area of slits 65. It will be apparent that the weights 77 may be omitted if the additional centrifugal force effect is not required and that they may be of any mass, if present. The governor acts to control flow from port 76 through the slits 65 and out port 78 and, as the rotational speed of shaft 59 increases, it acts to close the slits and thus throttle flow. The Bourdon tubes 63 provide means for varying the operating point or characteristic curve of the governor by varying the pressure applied to port 71. Variations in this pressure change the flow area of the throttling device at any given engine speed and thus the flow passed by the governor for any given pressure drop is a function both of rotational speed and of control pressure. If modulation of the governor operating point is not required, the tubes 63 and the fluid connections to them may be omitted.

The elastic tube valve device is highly advantageous in that it is readily responsive to control, has no relatively moving parts which may bind or stick, and has no wearing surfaces. It has one limitation which may make it unsuitable for certain requirements in that, as a practical matter, the valve cannot close completely. The effective range of variation of flow of the valve depends primarily upon the narrowness of the slits and the amount of flexure of the elastic tube. A flow or area range of three to one or more is easily attained, so that the valve has a throttling range sufficient for many requirements.

The slits 19 may be everywhere of equal width in the normal or relaxed configuration of the tube, or they may be tapered. For example, if the tube is forcibly increased or decreased in curvature and the slits 19 are produced by sawing, the slits will converge or diverge when the tube is in its relaxed condition. Very narrow slits may be provided by sawing the tubes with a very fine diamond saw, or by other means. It is also possible to provide narrow slits by sawing or milling relatively wide slits and then compressing or working the tube so as to close the slits against a sheet of thin shim stock temporarily disposed in the slit. Except for the provision of the slits and association of plural tubes, the structures of the various valve devices illustrated involve technology usual in the common Bourdon tube type of pressure gauge, and in the structure of rotating governors. For this reason, no detailed description of fabricating techniques or structural details is necessary.

The detailed description of the preferred embodiment of the invention for the purpose of explaining the principles thereof is not to be considered as limiting or restricting the invention, since many modifications may be made within the scope of the invention by the exercise of skill in the art.

I claim:

1. A speed-responsive throttling valve comprising, in combination, a rotatable shaft, at least one curved elastic tube mounted on the shaft so as to have its curvature varied by centrifugal force generated by rotation of the shaft, a fluid connection through the shaft to one end of the tube, the other end being closed, the tube having slits therein generally normal to the axis of the tube at one side, in the radial direction, of the axis of the tube so that variation of the curvature of the tube varies the area of the slits.

2. A valve as recited in claim 1 including a flyweight mounted on the closed end of the tube.

3. A valve as recited in claim 1 comprising also pressure-responsive control means connected to the tube operable to vary the curvature of the tube.

4. A valve as recited in claim 3 in which the control means is a Bourdon tube generally parallel to the elastic tube and bonded thereto.

5. A valve as recited in claim 4 including a flyweight mounted on the closed end of the tube.

References Cited by the Examiner
UNITED STATES PATENTS

| | | | |
|---|---|---|---|
| 1,384,113 | 7/21 | Arnold | 137—56 |
| 2,662,536 | 12/53 | Martiniok | 137—56 X |
| 3,138,946 | 6/64 | Amthor | 137—56 X |

ISADOR WEIL, *Primary Examiner.*